INVENTOR
WILLIAM H. BURKHART
BY William L. Glover
AGENT

INVENTOR
WILLIAM H. BURKHART
BY William S. Glover
AGENT

INVENTOR
WILLIAM H. BURKHART
BY William L. Glover
AGENT

June 9, 1959 W. H. BURKHART 2,890,440
MAGNETIC RECORDING SYSTEM
Filed Oct. 7, 1954 5 Sheets-Sheet 4

INVENTOR
WILLIAM H. BURKHART
BY William L Glover
AGENT

INVENTOR

WILLIAM H. BURKHART

BY William L. Glover

AGENT

United States Patent Office 2,890,440

Patented June 9, 1959

2,890,440

MAGNETIC RECORDING SYSTEM

William Henry Burkhart, East Orange, N.J., assignor to Monroe Calculating Machine Company, Orange, N.J., a corporation of Delaware Application October 7, 1954, Serial No. 460,958

10 Claims. (Cl. 340—174)

This invention relates to magnetic recording and more particularly to an improved magnetic, digital-data storage system.

Magnetic digital-data storage systems are used extensively, especially in electronic data processing equipment. In the more common systems, digital data is recorded in the form of magnetized spots in a homogeneous magnetic medium comprising the surface of a rotating drum, or a moving tape. Recording of data and later playing back thereof is accomplished by one or more transducing heads located in close proximity to the surface of the magnetic medium. Accurate positioning of the magnetized spots recorded by each head is effected by pulsing the latter in synchronism with the movement of the magnetic medium. Frequently, the heads are pulsed differentially to record spots of opposite polarity to represent binary one and binary zero. Playback of recorded spots is accomplished by amplifying the minute signals induced in a head as the spots move past the latter and detecting the identity of the spots from the wave shapes of the amplified signals.

The storage capacity of a system of the sort under discussion depends upon the maximum spot density (magnetized spots per unit length of magnetizable medium) which can be achieved without merging adjacent spots to the extent that the resultant playback signals are of insufficient magnitude or are too distorted to be identified as representing binary one or binary zero.

Magnetic storage systems embodying magnetic drums or magnetic tape equipment are extremely expensive due, in large part, to the high cost of the drums and the tape handling equipment. The cost of the latter items, of course, depends substantially on the storage capacity which is required which dictates the size and number of drums, or the number of tape transport mechanisms, to be used. Evidently an increase in the maximum spot density which is permissible with these drums and tapes effects a corresponding increase in the storage capacity thereof; and if such increases can be effected at little or no additional cost, substantial economies may be practiced.

The principal object of the invention, therefore, is the provision of an improved magnetic digital data storage system by which the maximum permissible spot density, and therefore the storage capacity of magnetic drums and tape and the like, is increased substantially at little or no additional cost over and above those encountered heretofore.

Other objects and features of the invention will become apparent from the following description when read in the light of the drawings, of which:

Fig. 1 is a fragmentary diagrammatic illustration of a recording head and the magnetic medium with which it cooperates;

Fig. 2 comprises a series of curves illlustrating typical operating characteristics of the recording arrangement of Fig. 1;

Figs. 3–5 comprise groups of curves illustrating the method of practicing high density recording according to the invention;

Before entering into a detailed description of the method and means of the invention, the subject of magnetic recording will be touched upon generally in order to provide a background which will aid in understanding said description.

Known methods for recording binary digital data on a moving magnetic medium may be divided into two groups of which one group employs discrete-record-signals while the second group employs indiscrete-record-signals. In discrete-record-signal systems the recording means are normally dormant and are pulsed differentially to record binary intelligence. In indiscrete-record-signal systems the recording means are normally biased to record a continuous representation of one or the other of the binary characters, representations of one or more of the opposite binary character being recorded by reversing the bias for one or more recording periods. For example, a D.C. bias of given polarity may be applied to a record head to effect recording of a continuous representation of binary zero for one or more recording periods; and representations of one or more binary ones may be recorded by reversing the polarity of said bias for the duration of one or more recording periods.

The indiscrete-record-signal method of magnetic reading is severely limited in its applications because the D.C. biases cannot be applied to record heads through transformers or magnetic core selection devices as can the pulses utilized in discrete-record-signal systems. For this and other reasons, the method and means of the instant invention utilize the discrete-record-signal method of recording.

Figures 1, 2, 3:
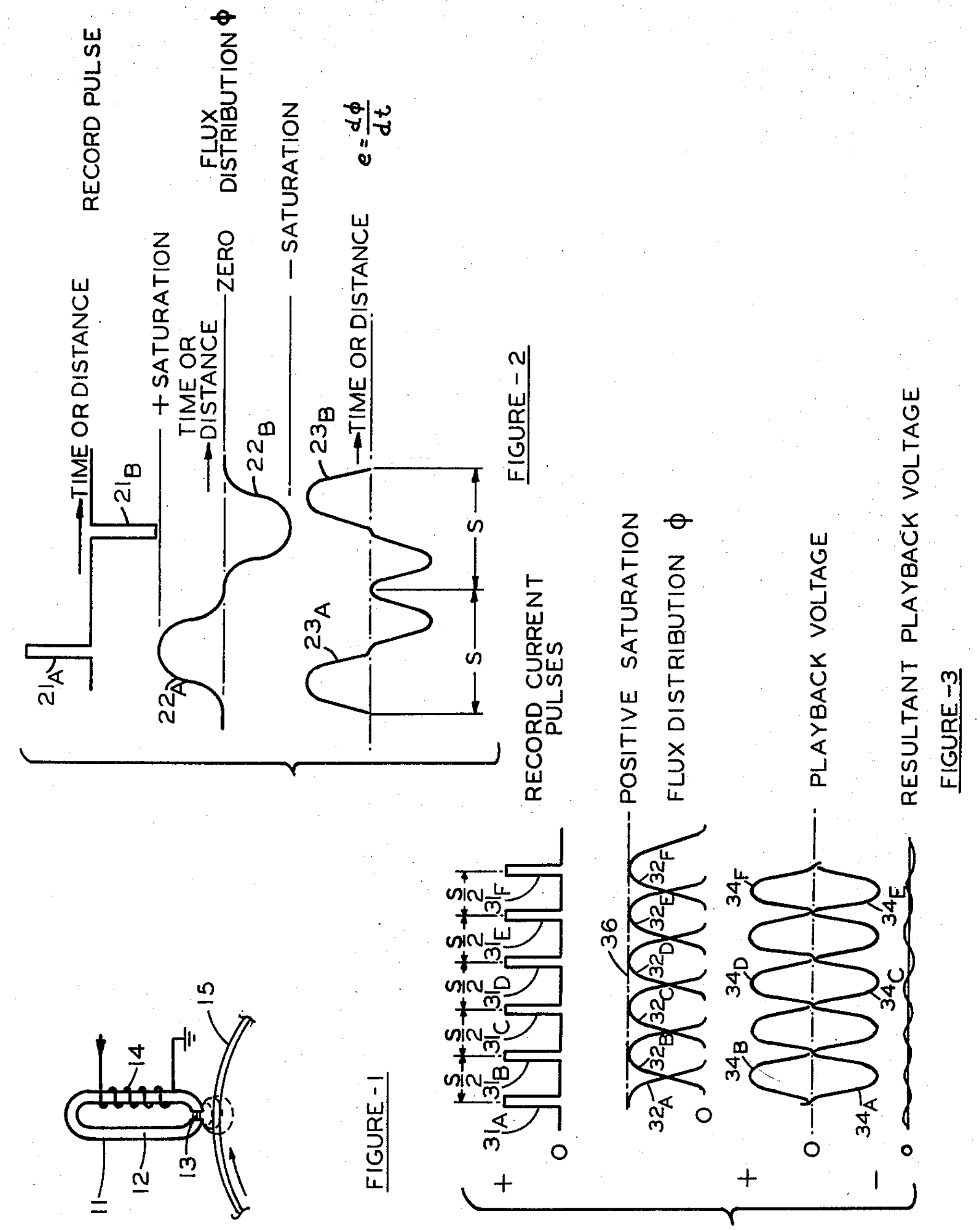

In known "discrete" magnetic storage systems, intelligence is recorded on a magnetic medium in the form of oppositely polarized magnetized spots representative of binary one and binary zero. Magnetization of the spots is accomplished by a transducing head 11 which may comprise (Fig. 1) a core 12 provided with an air gap 13, and a coil 14 wound on the core. The gap 13 is located in close proximity (approximately 0.001 or 0.002 inch) to the magnetic medium 15 to enable leakage flux thereat to link with the medium and saturate a minute area or spot thereof. Preferably, the magnetic medium is moved past the head at a constant velocity, while the coil 14 is energized to effect recording of spots, by current pulses of such short duration that the medium does not move appreciably during the breadth thereof. The polarization of each spot that is recorded by a given head is, of course, dependent on the polarity of the current pulse applied to the coil 14 of the head. For example, as shown in Fig. 2 application of a positive-going current pulse $\mathbf{21}_A$ to head 11 may produce a magnetized spot having a positive-going flux distribution pattern $\mathbf{22}_A$. Conversely, a negative-going current pulse $\mathbf{21}_B$ may produce a magnetized spot having a negative-going flux distribution pattern $\mathbf{22}_B$. Noting that the abscissa of the flux distribution chart of Fig. 2 represents distance along the path of the magnetic medium affected by the head, it is readily seen that the spot magnetized by each record pulse has a flux distribution pattern extending both ahead of and behind the point which is positioned immediately adjacent the gap on occurrence of the record pulse. Saturation values of magnetization are used in order to render the system insensitive to variations in the amplitude of the record current pulse above a minimum amplitude.

The head 11 may also be used for reading intelligence previously recorded on the magnetic medium. Movement of magnetized spots past the gap in the head, effects a change in the flux in core 12 which induces a voltage in the winding 14 thereof. The induced voltage is, for practical purposes, equal to the time derivative of the flux distribution $$\frac{d\phi}{dt}$$

of each spot. Consequently, the positive-going flux distribution pattern $\mathbf{22}_A$ of Fig. 2 effects production of a single, substantially sinusoidal, signal voltage $\mathbf{23}_A$ of wave length S which has a positive-going leading lobe and a negative-going trailing lobe. In similar fashion, the negative-going flux distribution pattern $\mathbf{22}_B$ effects production of a single, substantially sinusoidal, voltage signal $\mathbf{23}_B$ of wave length S, which has a negative-going leading lobe and a positive-going trailing lobe. Thus binary one and binary zero recordings are read as positive-negative and negative-positive sinusoidal voltage signals, respectively. This arrangement may, of course, be reversed if desired.

In known digital magnetic recording systems, spot density, and, therefore, the maximum storage capacity of the system, is limited by merging of the flux patterns of adjacent spots. Appreciable merging of the flux patterns effects distortion of the reading or playback signals, or reduces the amplitude thereof, to the extent that they cannot ready be identified as binary one or binary zero signals. The effects of merging of the flux patterns of adjacent spots on the playback signals produced thereby are not constant but vary with the relative polarities of the spots. Where the spots are of the same polarity, that is, representative of the same binary digit, the flux patterns merge subtractively. Where the spots are of opposite polarities, that is, representative of different binary digits, the flux patterns merge additively. Subtractive merging effects a reduction in the magnitudes of the adjacent lobes of the playback signals appropriate to the spots but does not merge these lobes into one lobe. Additive merging does effect a merging of these adjacent lobes and an increase in magnitude thereof.

Thus, each subtractive merging of flux patterns effects production of a pair of playback signal lobes of relatively small magnitude while each additive merging effects production of a single signal lobe of relatively large magnitude—the frequency of the small signal lobes is double that of the large lobes. A substantial degree of subtractive merging may effect such a drastic reduction in the magnitudes of the adjacent lobes of the playback signals, that the playback amplifiers are insensitive thereto. If further reduction in the magnitude of such signal lobes is desired, it may be effected through frequency discrimination in the playback head and/or amplifier which may be less sensitive to the higher frequencies.

It will be seen, therefore, that the distorted playback signals produced by merged flux patterns include large peaks to indicate that succeeding binary digits of the recorded intelligence are unlike, that is, the polarities of adjacent magnetized spots are different; and, also smaller waves of twice the frequency of the large peaks to indicate that succeeding binary digits are alike, i.e. adjacent magnetized spots are of the same polarity. This distortion phenomena forms the basis of the magnetic storage system of the invention as will appear hereinafter.

The maximum spot density which can be attained in a given known system without distortion of the playback signals may be determined from the wave length S of an undistorted playback signal; and where L represents a unit length of the magnetic medium, the maximum spot density is $$\frac{L}{S}$$

spots per unit length as shown in Fig. 2. In actual practice, however, some distortion of the playback signal is permissible, so that the flux patterns of adjacent magnetized spots may be merged somewhat to provide a maximum spot density somewhat greater than $$\frac{L}{S}$$

According to the invention a spot density of at least $$\frac{2L}{S}$$

bits per unit length is readily attained. This, it will be noted, is approximately double the bit density heretofore obtainable in discrete-record-signal magnetic recording systems.

To practice the invention record pulses are produced at, say, double the frequency indicated in Fig. 2, that is, at intervals of one-half the wave length of an undistorted playback signal $$\left(\frac{S}{2}\right)$$

A first one of these record pulses which may be of either polarity is applied to a recording head to record a "marker" on the magnetic medium. Then, binary intelligence is recorded with each succeeding record pulse. A binary zero is recorded by applying a record pulse of the same polarity as the preceding one to a record head, while binary one is recorded by applying a record pulse of opposite polarity to the one which preceded it, to a record head.

Referring now to Fig. 3, a series of positive-going record pulses 31 are spaced at intervals of $S/2$. The flux pattern 32 which would be produced by the record pulses 31, if each was unaffected by the adjacent ones, are illustrated in full lines and bear the same alphabetical subscripts as the pulses responsible for the same. The resultant flux pattern which is the combined product of all the pulses is represented by the substantially straight dot-dash line 36 at positive saturation. It is readily seen that the time derivative of the resultant flux pattern $$\frac{d\varphi}{dt}$$

that is, the playback voltage, is approximately zero. This zero volt playback may also be explained in terms of the theoretical undistorted playback signals. Examination of the playback signals 34 of Fig. 3 which the flux patterns 32 would produce if they did not overlap, reveals that each signal overlaps the preceding one by one-half the wave length S. Consequently, the postive-going leading lobe of each sinusoidal playback signal is superimposed upon the negative-going trailing lobe of the preceding signal. It is readily apparent that when the two substantially equal and opposite voltages are combined, the resultant voltage is approximately zero.

In similar manner, a series of negatively directed record current pulses spaced in the same way also produce a resultant playback signal of approximately zero voltage.

Figure 4:
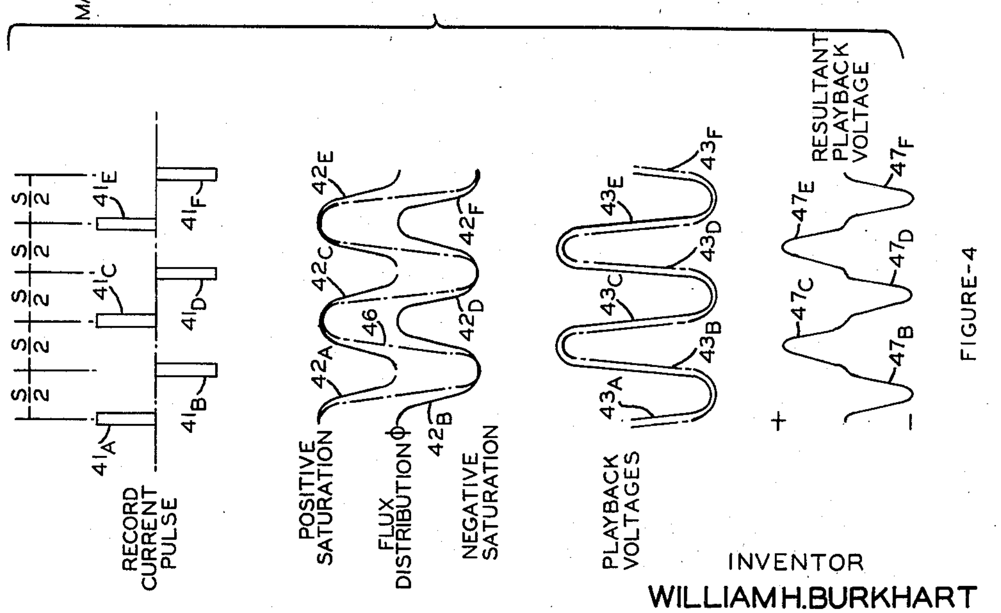

Referring now to Fig. 4 a series of alternately positive- and negative-going record pulses 41 are spaced at intervals of $S/2$. The flux pattern 42, which each record pulse would produce if each was not effected by the adjacent one, is illustrated in full lines and bears the same alphabetical subscript as the record pulse which produces it. The resultant flux pattern, which is the combined product of all of the pulses is the substantially sinusoidal dot-dash line 46 which alternates between positive and negative saturation. The time derivative of the flux pattern, that is, the playback voltage, is illustrated at 47 where it is seen that each binary digit playback signal comprises a pulse-like peak having an amplitude of substantially twice that of the playback voltage of Fig. 2. A study of the individual playback signals which each of the flux patterns 42 would produce if there were no interference between adjacent flux patterns leads to the same conclusion. Each playback signal overlaps the preceding signal by one-half wave length such that a positive lobe is superimposed on a positive lobe and a negative lobe is superimposed on a negative lobe. Combining overlapping lobes results in a playback signal 47 of half the frequency of the playback signals 43 and approximately twice the amplitude.

Figure 5:
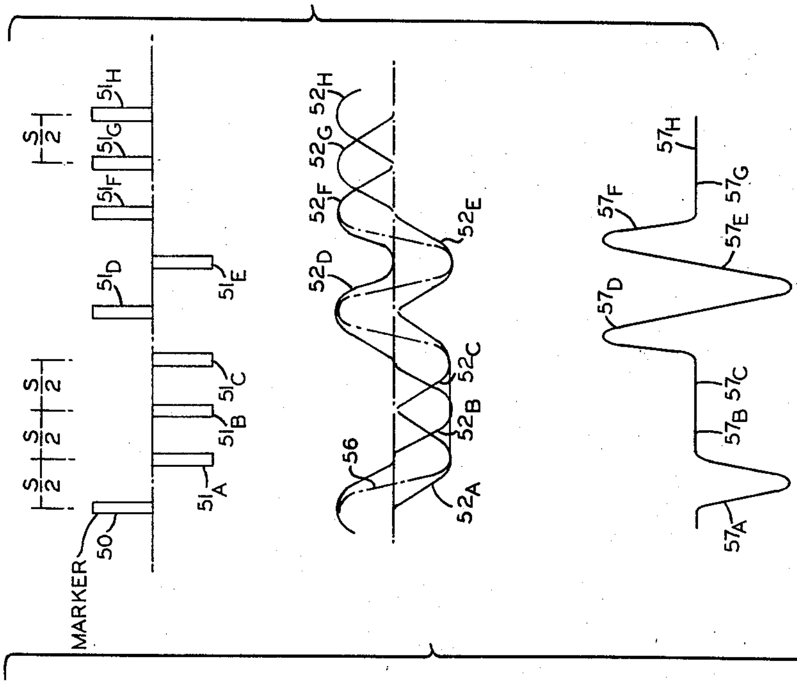

Referring now to Fig. 5, the manner in which an exemplary binary number 100111000 is recorded and the flux patterns and playback signals obtainable from such recording are illustrated diagrammatically. As shown, a positive record pulse 50 is empirically chosen to record the "marker." Then, a record pulse of opposite polarity, namely the negative pulse $\mathbf{51}_A$ is used to record the binary one in the highest denominational order of the number. Following this, similar negative pulses $\mathbf{51}_B$ and $\mathbf{51}_C$ are used to record the binary zeros in the two next lower denominational orders of the number. Next a pulse of opposite polarity, namely positive pulse $\mathbf{51}_D$ is used to record the binary one in the fourth from the highest order. Similarly, pulses $\mathbf{51}_E$, $\mathbf{51}_F$, $\mathbf{51}_G$ and $\mathbf{51}_H$ of appropriate polarity are used to record the remaining binary digits of the number. For convenience, the individual flux patterns which the pulses 51 would produce if there was no interference between adjacent patterns, are shown in full lines at $\mathbf{52}_A$—$\mathbf{52}_H$ while the resultant flux pattern produced by their interference with one another is shown by the dot-dash line 56.

The time derivative of the resultant flux pattern 56, that is, the playback signal 57 comprises a pulse-like peak of either polarity to represent each binary one and a neutral or zero volt signal to represent binary zero.

It is believed evident that, if desired, the method may be modified to have the pulses represent binary zeroes.

In applying the invention to a given system it may be inconvenient or even impossible to effect such a perfect merger of adjacent flux patterns that the adjacent halves thereof will cancel one another completely and produce a neutral or zero volt playback signal to represent binary one as described above. In this event binary zero signals may comprise a pair of signal lobes of smaller magnitude than but double the frequency of the binary one signals. A technique to be described hereinafter may be utilized to cancel, or, at least to attenuate, these binary zero signals, or, the playback means may be enabled to distinguish between the relative magnitudes of the binary one and binary zero signals.

A preferred embodiment of the means of the invention will now be disclosed.

Figure 6:
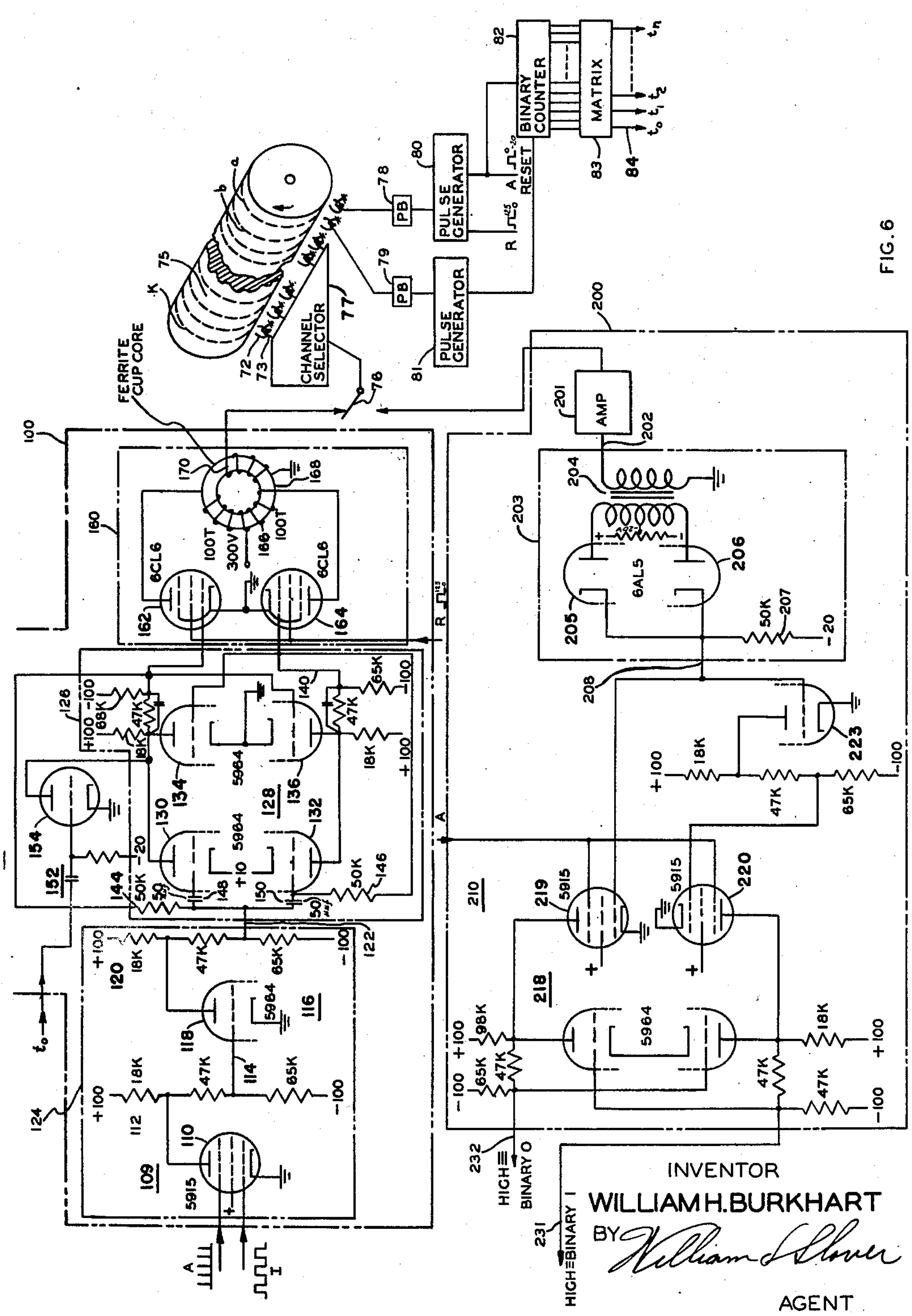
Fig. 6 is a detailed wiring diagram of a preferred embodiment of record and playback means for storing information according to the method of the invention.

Referring to Fig. 6 a record circuit 100 and a playback circuit 200 are provided to record information on and read information from a multichannel magnetic drum 75. Selection between the channels of drum 75 is accomplished by a selection circuit 77 which connects the record and playback circuits with the reading-recording heads 72 for the several channels selectively. The selection circuit may be of any suitable sort, for example, the relay circuit shown in co-pending application Ser. No. 255,712 to J. McCarroll et al., filed November 9, 1951, or the saturable magnetic core circuit disclosed in co-pending application Ser. No. 382,167 to A. H. Sepahban, filed September 24, 1953. A switch 76 may be used to select record circuit 100 or the playback circuit 200 for connection with the selected head according to which function is to be performed.

In the illustrated instance of the invention, information to be stored on the drum is in the form of words containing $n$ binary digits and each channel of the drum has a capacity of $n+1$ binary digits. The extra digit space in each channel is used for recording the "marker."

In order to time the operations of the record and playback circuits a pair of timing tracks $a$ and $b$ are provided on the drum 75, the former having a full complement of $(n+1)$ equally spaced magnetic spots recorded therein and the latter having a single spot recorded therein. The spots recorded in track $a$ have a spacing of $S/2$ (half the wave length of an undistorted playback signal from one of the heads 72). Playback means 78 and 79 for tracks $a$ and $b$ actuate pulse generators 80 and 81, respectively, of which the former produces pulse trains A and R (see Fig. 7) and the latter produces a single pulse for each revolution of the drum. The A, or advance, pulses are positive-going pulses which rise from a quiescent level of −20 volts to the zero volt level and whose trailing edges mark the end of each time period $t_0$–$t_n$ of a cycle and the beginning of the next. The R pulses are sharp positive-going pulses which rise from zero to 125 volts and which occur at the center of each time period. As will appear hereinafter the R pulses are utilized to time the operations of the record circuit in order to properly position the recording of each binary digit. In the illustrated instance of the invention, the time periods $t_0$–$t_n$ are approximately 8 microseconds long; and the A and R pulses are two microseconds and one microsecond wide, respectively. Playback means 79 and pulse generators 80 and 81 may be of any suitable known design. Playback means 78, however, may comprise amplifiers tuned to the frequency of the binary zero playback signals obtained from a full complement of binary zero recordings in timing track $a$. It is assumed here, of course, that perfect subtractive merging of adjacent flux patterns in track $a$ is not achieved. If desired, the spots recorded in track $a$ may have a greater spacing than $S/2$, say S, and any conventional playback means 78 supplemented by known frequency multiplying (doubling) means may be utilized to obtain the appropriate pulse frequency from generator 80.

The A pulses are applied to a time period counter 82 which is advanced one count by each pulse. Counter 82 may be a binary counter of any known sort, adapted to count at least to $n+1$ and adapted to be reset to zero by the output of pulse generator 81 at the beginning of time period $t_0$ of each cycle. The several stages of counter 82 are connected to a matrix 83 adapted to reflect, on output lines 84 thereof, the counts attained by the counter. The matrix may be of any suitable sort, for example a crystal rectifier network. Obviously, output lines 84, while indicating the counts attained by counter 82 also indicate the time periods in which the counts are attained. For example, the $t_0$ output line 84 assumes a high potential (zero volts) for the duration of time period $t_0$ and a low potential (−20 volts) at all other times.

In the illustrated embodiment of the invention, logical potential levels of zero volts and −20 volts are used throughout and, for convenience, will hereinafter be referred to as "high" and "low," respectively.

Figure 7:
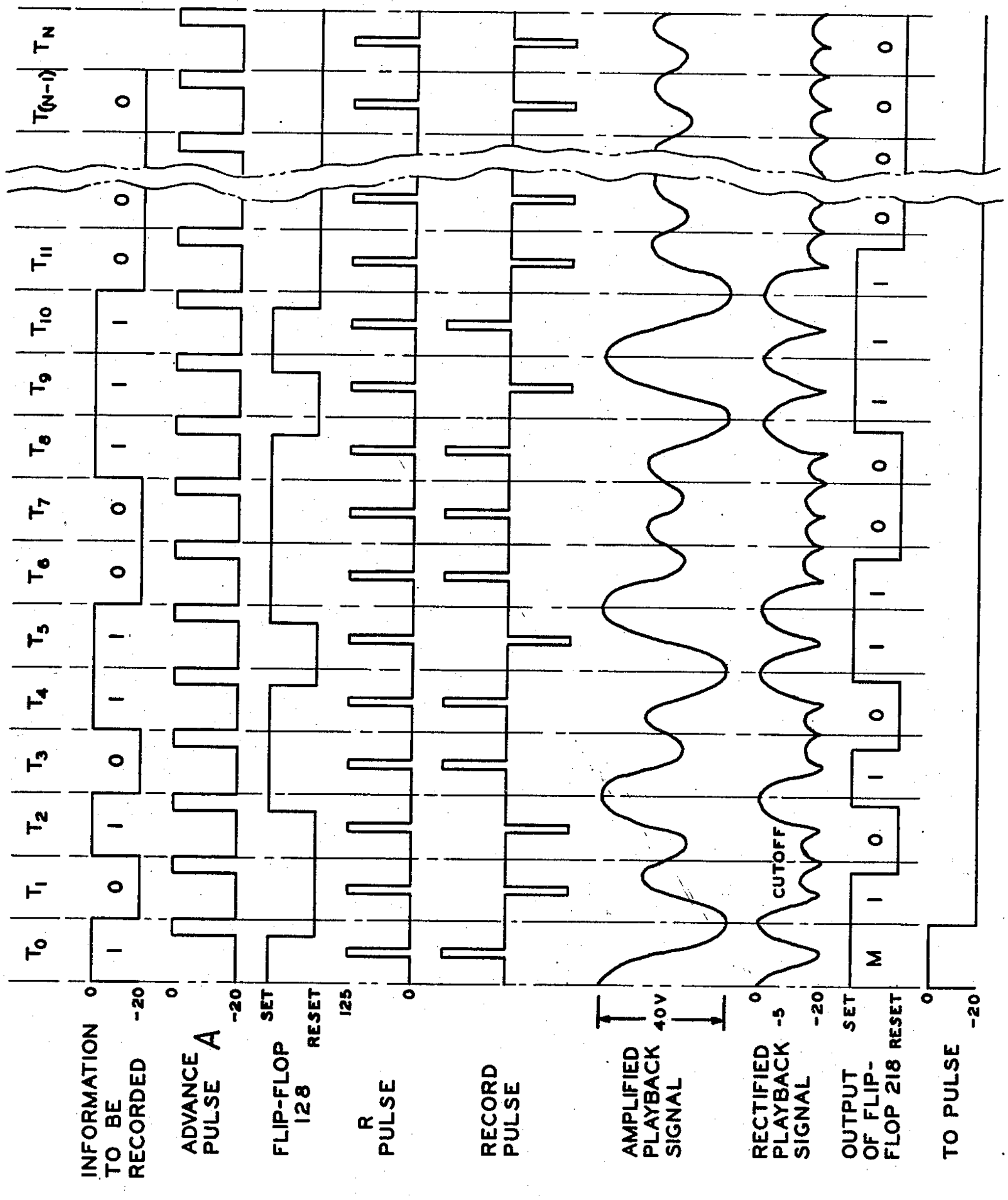
Fig. 7 is a pulse diagram illustrating the relative timing of certain pulses which control or are produced by the means of Fig. 6.

An information word to be recorded is applied to record circuit 100 as a train of high and low pulses indicative of binary one and binary zero, respectively, during time periods $t_0$–$t_{(n-1)}$ (see Fig. 7).

The record circuit includes a coincidence gate or detector 109 to which the information pulse trains are applied along with the A pulses described above. Preferably the coincidence gate comprises a pentode 110 of the type whose suppressor grid serves as a second control grid. The cathode of the pentode is grounded, its screen grid is connected to a source of suitable positive potential and its anode is connected to the juncture of the two positivemost sections of a voltage divider 112, connected between sources of +100 and −100 volts potential. An output line 114 is extended from the juncture of the two negativemost sections of the voltage divider, which, it will be noted, comprises the centertap thereof. Utilizing the resistor values shown, output line 114 assumes high (0 volt) and low (−20 volts) potentials on cut off and conduction of the pentode, respectively. Pentode 110 is conditioned for conduction by application of a high potential representative of a binary one in an information pulse train to its first control grid at the beginning of a time period (Fig. 7) and conducts on application of an A pulse to its second control grid at the end of said time period. The output line 114 of the coincidence gate is applied to an inverter 116 which comprises a triode 118 having its cathode grounded and its anode connected to a voltage divider 120 identical with the voltage divider 112 described above. Whenever output line 114 assumes a high potential an output line 122 of the inverter assumes a low potential and vice versa.

The coincidence detector and the inverter may be looked upon as an identity detection circuit 124 which normally produces a low potential on its output line 122 but which produces a high output potential during the A pulse interval of a time period during which a binary one representation in an information pulse train is applied to the circuit.

The output line 122 controls a record control circuit 126 which includes a flip-flop 128 and pullers 130 and 132 therefor. The flip-flop may comprise a pair of inverters 134 and 136, substantially identical to the inverter 116, each having its output line 138 or 140 applied to the grid of the other. As shown, speed-up condensers may be connected across the center resistors of the voltage dividers of inverters 134 and 136. Conduction of either inverter triode maintains the other cut off in familiar fashion. The pullers 130 and 132 comprise triodes having their cathodes connected to a source of positive bias, for example +10 volts, and their anodes coupled directly to those of the inverter triodes. The outputs 138 and 140 of the flip-flop are coupled back through resistors 144 and 146 to the grids of the pullers 130 and 132, respectively. Also, the output line 122 of the identity detection circuit 124 is "center-coupled" to the grids of the pullers through condensers 148 and 150. The arrangement is such that the output line 138 or 140 of the flip-flop which is associated with the cut off triode of the latter, applies a high potential (0 volts) to the grid of the puller 130 or 132 connected with that triode to condition the puller for conduction. When output line 122 of the identity detection circuit assumes a high potential representative of binary one at the end of a time period, the potential of the puller grid is raised from the zero volt level toward the +20 volt level, overcoming the positive cathode bias and effecting conduction of the puller. This lowers the output potential of the associated inverter and cuts off the other inverter, thus reversing the state of the flip-flop. Evidently, therefore, flip-flop 128 is shifted from whatever state it is in to the opposite one at the end (A pulse interval) of each time period during which a binary one representation is applied to the identity detection circuit.

In order to set flip-flop 128 to a desired state preliminary to the presentation of an information pulse train to the record means for the purpose of recording a "marker" during time period $t_0$, the output of matrix 83 indicative of said time period of $t_0$ is applied through a differentiator 152 to a puller triode 154 whose anode is connected to that of the puller 130 for flip-flop 128. On initiation of time period $t_0$, differentiator 152 applies a sharp positively directed pulse to puller 154 which conducts and lowers the potential at the output line 138 of flip-flop triode 134, if it is not already low, to cut off the other flip-flop triode 136.

The output lines 138 and 140 of flip-flop 128 are applied to a record pulse producing circuit 160 to effect production of differentially polarized record pulses for application to the winding 73 of a selected one of the reading-recording heads 72. As shown, the output lines 138 and 140 are applied to the control grids of a pair of pentodes 162 and 164 whose cathodes and suppressor grids are grounded and whose screen grids have the record pulses R from the pulse generator 80 applied thereto. The anodes of the pentodes 162 and 164 are connected to either end of the primary winding 166 of a transformer 168. A centertap of this winding 166 is connected to a source of high positive potential, say +300 volts. A secondary winding 170 of the transformer is connected between ground and the switch 76, which it will be remembered, is utilized for connecting the record circuit 100 and the playback circuit 200 with the winding 73 of a reading-recording head 72, selectively.

The pentodes 162 and 164 conduct alternatively and effect current flow in opposite directions in primary winding 166 and, therefore, in secondary winding 170 and winding 73 of a selected head 72. Thus the said head is enabled to produce record pulses of opposite polarity as indicated in Fig. 7.

It will be seen, therefore, that during the A pulse interval at the end of each time period, the flip-flop 128 is shifted to a new setting if a binary one representation is presented to the record circuit during that time period. Otherwise, the flip-flop is not shifted. Then, on the occurrence of the R pulse during the next time period the pentode 162 or 164 appropriate to the setting of the flip-flop conducts and effects a production of a record pulse of the proper polarity to record the said digit on the drum 75. Record pulses of opposite polarity to the preceding ones are used to record binary ones while record pulses of the same polarity as the preceding ones are used to record binary zeroes.

An operation of the record circuit to record an $n$ binary digit word will now be described with reference to Fig. 7. The high and low potential representation of an $n$-bit word is applied to the input line of the record circuit during time periods $t_0$–$t_{(n-1)}$. The $t_0$ pulse from matrix 83 is effective to set flip-flop 128 early in time period $t_0$, and the "marker" is recorded on the drum at R pulse time of that time period. Later, at A pulse time of time period $t_0$, a binary one is detected by circuit 124 (Fig. 6) and the flip-flop 128 is shifted to condition circuit 160 to record an indication of a binary one. However, actual recording of the binary one indication does not occur until R pulse time of the following time period, that is, time period $t_1$. At A pulse time of time period $t_1$ a binary zero is detected by circuit 124 and, as a result, flip-flop 128 is not shifted. Therefore, at R pulse time of time period $t_2$ a binary zero indication is recorded. This procedure continues during the succeeding time periods until the last binary digit of the word is recorded during time period $t_n$. It is to be noted that an $n$ binary digit word applied to the record circuit during the time periods $t_0$–$t_{(n-1)}$ is actually recorded during time periods $t_1$–$t_n$.

Referring to Fig. 6 the playback circuit 200 comprises an amplifier 201, a rectifier section 203, and an identity detection circuit 210.

During playback operations the minute signals induced in a head 72 by recorded flux patterns are transmitted to amplifier 201 which may be of any suitable sort capable of amplifying them to a greater, more manageable amplitude, say 40 volts peak-to-peak. An amplified playback signal is illustrated in Fig. 7 where it is seen that a binary one is represented by a 20 volt pulse of either polarity (40 volt peak-to-peak) whereas a binary zero is represented by a signal of much lesser amplitude, and of twice the frequency. The showing of Fig. 7 presumes by way of example, that the adjacent halves of contiguous flux patterns do not completely cancel one another but rather, effect production of binary zero playback signals which may after amplification, have a magnitude of, say, five or seven volts.

The amplified playback signals are transmitted via line 202 to rectifier section 203 which comprises a transformer 204 and a pair of diodes 205 and 206. The primary of transformer 204 is connected between conductor 202 and ground while the secondary thereof is connected between the anodes of the diodes 205 and 206 and has a center tap connected to a source of negative bias, say −20 volts. Preferably the connection is to a potentiometer or other means capable of varying the bias to obtain optimum results. The cathodes of the diodes are connected to a −20 volt source through a resistor 207, and to output line 208. Rectifier circuit 203 converts the amplified, sinusoidal playback signals into positively directed pulses based on the −20 volt bias potential. Approximately twenty volt pulses are produced for binary ones while substantially smaller pulses are produced for binary zeroes.

Identity detection circuit 210 comprises a flip-flop 218 which may be identical with flip-flop 128 of the record circuit and which is controlled by a pair of pentode pullers 219 and 220. The pentodes 219 and 220 are of the same type as the coincidence gate pentode 110 described above and their anodes are connected to those of the flip-flop triodes. The output line 208 of the rectifier circuit 203 is connected to the control grid of pentode 219 while the output of an inverter 223 controlled by said line 208 is applied to the control grid of pentode 220. In the illustrated instance of the invention the pentode 219 and inverter 223 cut off on application of approximately −5 volts to their control grids. Therefore the signals produced by rectifier circuit 203 should rise above the −5 volt level for binary one but should not rise above, say −7 volt level for binary zero. The cathodes of the pentodes are grounded and the screen grids thereof are connected to a source of suitable positive potential. The A pulses produced by pulse generator 80 are applied to the suppressor or second control grids of the pentodes and the flip-flop 218 is provided with a pair of output lines 231 and 232 of which the former assumes a high potential (0 volts) when the flip-flop is set to a state representative of binary one and the latter assumes a high potential when the flip-flop is set to the opposite state to represent binary zero. The flip-flop is set to the binary one state by puller 219 which conducts on coincident application to its control grids of an A pulse and a high (approximately zero volts) signal indicative of binary one from the rectifier circuit 203. Referring also to Fig. 7 it will be noted that the peak of each rectified, binary one playback signal occurs substantially in synchronism with the related A pulse so that each such signal effects appropriate setting of the flip-flop. The flip-flop is set to its binary zero state by puller 220 which conducts on coincident application to its control grids of an A pulse and a high output from inverter 223 indicative of binary zero. Inverter 223 is cut off to produce such an output whenever the output of the rectifier circuit 203 fall substantially below the peak or zero volt level thereof. Referring to Fig. 7 it will be seen that the output of the rectifier circuit never rises above, say, −13 volts in response to binary zero playback signals, so that each said signal effects appropriate setting of the flip-flop.

Figure 9:
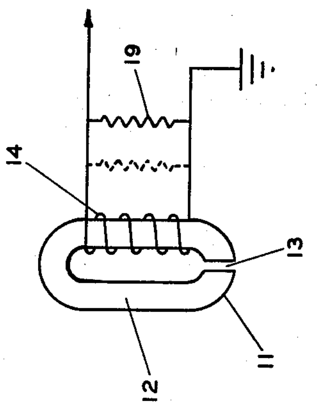
Fig. 9 is a fragmentary, diagrammatic illustration similar to Fig. 1 but shows the additional feature of the invention whose operation is illustrated in Fig. 8.

As mentioned hereinabove it may be inconvenient or even impossible to merge the adjacent halves of contiguous flux patterns to the degree required for them to cancel one another completely, and, as a result, binary zero playback signals of appreciable magnitude may be obtained. These signals are of double the frequency of the larger magnitude binary one playback signals. According to the invention these binary zero signals are eliminated, or at least, substantially atenuated, by adjusting the playback means to provide poor response at the high frequency of the binary zero signals but good response at the lower (½) frequency of the binary one signals. Preferably, the frequency discrimination is effected by increasing the time constant of the playback head which is equal to $$\frac{L}{R}$$

where L equals the inductance of the head and R equals, for practical purposes, the resistance of the winding of the head. As shown in Fig. 9 a resistor 19 may be connected across the winding 14 of a head 12 to parallel the resistance 19A of the winding illustrated in dotted lines. This, of course, decreases the value of R in the expression $$\frac{L}{R}$$

and the time constant is lengthened. If desired, the same effect may be achieved by connecting a condenser across the winding.

Figure 8:
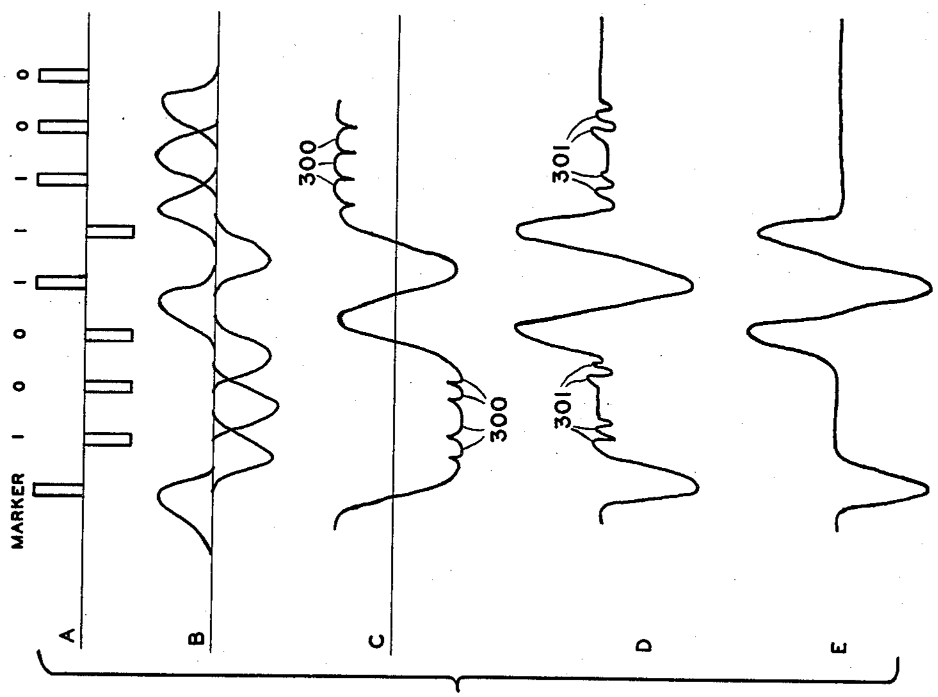
Fig. 8 is a pulse diagram similar to Fig. 5 but illustrates the operation of an additional feature of the invention.

Referring now to Fig. 8 which illustrates the same recording example as Fig. 5 (see lines A and E) it will be noted (line B) that the leading half of each flux pattern does not completely overlap the lagging half of the preceding pattern. This results in the composite flux pattern of line C which includes a pair of diagrammatically illustrated dips 300 for each such incomplete, subtractive overlapping. Referring now to line D the playback signal which might result from the flux pattern of line C is shown complete with double frequency, low magnitude binary zero signals 301. Line E of Fig. 8 illustrates the playback signal which results when the effects of the dips 300 of line C are eliminated through frequency discrimination as in Fig. 9.

It will be seen, therefore, that basically, the method of the invention comprises recording magnetic spots of opposite polarity to the next previously recorded ones to represent one binary state and of the same polarity as the next previously recorded ones to represent the opposite state, at a frequency to effect sufficient merging of the flux patterns of contiguous magnetized spots to produce a resultant flux pattern having relatively large swings to represent one binary state and smaller swings of twice the frequency of the larger swings, or no swing at all, to represent the opposite state. The method also includes converting the large swings into potential representation of the opposite state in the absence of a said large swing. The method may also include frequency discriminative preventing of the conversion of any smaller swings into potential representations.

More specifically, the method of the invention comprises pulsing a magnetic transducing head at substantially the same time during each of a series of successive recording periods, with either polarity during a first period, and, during each succeeding period, with the same polarity as during the preceding period to represent one binary state and with the opposite polarity to that of the preceding period to represent the opposite binary state, the frequency of pulsing being such as to effect as much merging of the adjacent halves of the flux patterns resulting from successive pulses as is practicable and to produce a resultant flux pattern having large swings representative of said one binary state and smaller swings of twice the frequency of the large swings—representative of the other state. The method also comprises producing a potential representation of said one binary state on the occurrence of each large swing and producing a potential representation of the opposite state in the absence of a said large swing. The method may also include frequency discriminative suppression of the effect of any smaller swings to prevent conversion thereof into potential representations.

According to the invention the method may be carried out not only by the described means of the invention, but also by any other suitable means. For example, rectifier circuit 203 and identity detection circuit 210 may be replaced by any amplitude discriminative means capable of producing one output under stimulus of signals of a given magnitude regardless of polarity and a second output under stimulus of signals of substantially smaller magnitudes, i.e. a cathode ray tube provided with a pair of targets appropriately positioned for impingement by the beam only on application of a signal of at least said given magnitude to one of its vertical deflection plates, the other plate being grounded or otherwise neutralized; and a coincidence detector controlled by the targets and by timing pulses such as the described A pulses.

In like manner, record circuit 100 may be replaced by any other circuit capable of pulsing a record head differentially in the described manner. For example, the record circuit may comprise a pair of type 2D21 gas tubes having their anodes coupled together through a capacitor, and coupled to a source of positive potential, say +100 volts through resistors. The anodes of the tubes would also be condenser coupled to the ends of the primary winding of a transformer like transformer 168 (Fig. 6). The center tap of the transformer and the cathodes of the tubes would be grounded. The information pulse trains would be applied to the first grid of each tube and the R pulses would be applied to their second grids. One of the tubes is fired preparatory to application of a data pulse train to the circuit to record a marker, by any suitable means, for example, a preliminary pulse applied to its first grid in coincidence with the application of an R pulse to its second grid. Coincident application of a high potential representative of binary one and an R pulse to the grids of the cutoff tube effects conduction thereof and, a sharp pulse is applied to the transformer through the associated anode-to-transformer condenser. At the same time a pulse is applied through the anode-to-anode condenser to drive the anode of the other tube negative and cuit it off. The time constant controlling this action is adjusted to maintain the anode at a negative potential (with respect to its cathode) until the related R pulse has terminated. It will be noted that with this record circuit, data would be recorded during the time period in which it is applied to the circuit, not during the next time period as with circuit 100 (Fig. 6).

While there has been above described but a single embodiment of the invention, many modifications and additions may be made therein without departing from the spirit of the invention and it is not desired therefore, to limit the scope of the invention except as set forth in the appended claims or as dictated by the prior art.

I claim:

1. In a magnetic storage system wherein binary intelligence represented by a train of differential pulses is recorded in a magnetic medium, the combination of identity detection means for identifying the binary characters represented by the pulses of said train, and for producing a signal to mark each identification of a particular binary digit, bi-stable means shifted from state to state by said signals to produce two outputs alternatively, pulsing means actuated differentially by said outputs, a magnetic transducing head pulsed differentially by the pulsing means to record spots of opposite polarities, amplifying means for amplifying playback signals induced in the head by said spots, a full wave rectifier controlled by the output of the amplifying means, and means including a sectond bi-stable means and amplitude responsive driving means therefor controlled by the output of the rectifier to produce a first output when the rectifier output exceeds a predetermined magnitude and a second output when it is less than said predetermined magnitude.

2. In a magnetic storage system wherein binary intelligence represented by a train of differential pulses is recorded in a magnetic medium as a series of magnetized spots whose flux patterns overlap to produce a resultant flux pattern having large swings representative of one binary character and smaller swings of twice the frequency of the larger swings or no swings at all to represent the opposite character, the combination of identity detection means for identifying the binary characters represented by the pulses of said train, and for producing a signal to mark each identification of a particular binary digit, bi-stable means shifted from state to state by said signals to produce two outputs alternatively, means for producing timing pulses at a frequency to effect the said flux pattern overlap, pulsing means operated differentially under control of said outputs and said timing pulses, and a magnetic transducing head pulsed differentially by the pulsing means to record spots of opposite polarities.

3. In a magnetic storage system wherein binary intelligence represented by a train of differential pulses is recorded in a magnetic medium as a series of magnetized spots whose flux patterns overlap to produce a resultant flux pattern having large swings representative of one binary character and smaller swings of twice the frequency of the larger swings or no swings at all to represent the opposite character, the combination of identity detection means for identifying the binary characters represented by the pulses of said train, and for producing a signal to mark each identification of a particular binary digit, bi-stable means shifted from state to state by said signals to produce two outputs alternatively, means for producing timing pulses at a frequency to effect the said flux pattern overlap, pulsing means operated differentially under control of said outputs and said timing pulses, a magnetic transducing head pulsed differentially by said pulsing means to record spots of opposite polarity amplifying means for amplifying playback signals induced in the head by said spots, a full wave rectifier controlled by the output of the amplifying means, and mean including a second bi-stable means and amplitude responsive driving means therefor controlled by the output of the rectifier and said timing pulses to produce a first output when the rectifier output exceeds a predetermined magnitude and a second output when it is less than said predetermined magnitude.

4. In a magnetic storage system wherein binary intelligence represented by a train of differential pulses is recorded in a magnetic medium as a series of magnetized spots whose flux patterns overlap to produce a resultant flux pattern having large swings representative of one binary character and smaller swings of twice the frequency of the larger swings or no swings at all to represent the opposite character, the combination of identity detection means for identifying the binary characters represented by the pulses of said train, and for producing a signal to mark each identification of a particular binary digit, bi-stable means shifted from state to state by said signals to produce two outputs alternatively, means for producing timing pulses at a frequency to effect the said flux pattern overlap, pulsing means operated differentially under control of said outputs and said timing pulses, a magnetic transducing head pulsed differentially by the pulsing means to record spots of opposite polarities, and means for actuating the two-output means prior to the initial operation of the identity detection means on a train of pulses.

5. In a magnetic storage system wherein binary intelligence represented by a train of differential pulses is recorded in a magnetic medium as a series of magnetized spots whose flux patterns overlap to produce a resultant flux pattern having large swings representative of one binary character and smaller swings of twice the frequency of the larger swings or no swings at all to represent the opposite character, the combination of identity detection means for identifying the binary characters represented by the pulses of said train, and for producing a signal to mark each identification of a particular binary digit, a center fed flip-flop shifted from state to state by said signals, means for producing timing pulses at a frequency to effect the said flux pattern overlap, a pair of coincidence detectors controlled by said flip-flop and said timing pulses and actuated alternatively thereby, a pulse transformer energized differentially by said pair of coincidence detectors and a magnetic transducing head pulsed differentially by said transformer to record spots of opposite polarities.

6. In a magnetic storage system wherein binary intelligence represented by a train of differential pulses is recorded in a magnetic medium as a series of magnetized spots whose flux patterns overlap to produce a resultant flux pattern having large swings representative of one binary character and smaller swings of twice the frequency of the larger swings or no swings at all to represent the opposite character, the combination of identity detection means for identifying the binary characters represented by the pulses of said train, and for producing a signal to mark each identification of a particular binary digit, a center fed flip-flop shifted from state to state by said signals, means for producing timing pulses at a frequency to effect the said flux pattern overlap, a pair of coincidence detectors controlled by said flip-flop and said timing pulses and actuated alternatively thereby, a pulse transformer energized differentially by said pair of coincidence detectors, a magnetic transducing head pulsed differentially by said transformer to record spots of opposite polarity, means for amplifying playback signals induced in the transducing head, a full wave rectifier for rectifying the output of the amplifying means, second timing pulse producing means, a second pair of coincidence detectors controlled by the rectifier and the last mentioned timing pulses, one of said second coincidence detectors being actuated when the magnitude of the rectifier output exceeds a predetermined figure and the other of said second coincidence detectors being actuated when the output is less than that figure, and a flip-flop set to opposite states by said second coincidence detectors.

7. In a magnetic storage system wherein binary intelligence represented by a train of differential pulses is recorded in a magnetic medium as a series of magnetized spots whose flux patterns overlap to produce a resultant flux pattern having large swings representative of one binary character and smaller swings of twice the frequency of the larger swings or no swing at all to represent the opposite character, the combination of a magnetic transducing head located in close proximity to the surface of the magnetic medium, amplifying means for amplifying playback signals induced in the head by said spots, a full wave rectifier controlled by the output of the amplifying means, and means including a bi-stable means and amplitude responsive driving means therefor controlled by the output of the rectifier to produce a first output when the rectifier output exceeds a predetermined magnitude and a second output when it is less than said predetermined magnitude.

8. In a magnetic storage system wherein binary intelligence represented by a train of differential pulses is recorded in a magnetic medium as a series of magnetized spots whose flux patterns overlap to produce a resultant flux pattern having large swings representative of one binary character and smaller swings of twice the frequency of the larger swings or no swing at all to represent the opposite character, the combination of a magnetic transducing head located in close proximity to the surface of the magnetic medium, means for amplifying playback signals induced in the transducing head, a full wave rectifier for rectifying the output of the amplifying means, timing pulse producing means, a pair of coincidence detectors controlled by the rectifier and said timing pulses, one of said coincidence detectors being actuated when the magnitude of the rectifier output exceeds a predetermined figure and the other of said coincidence detectors being actuated when the output is less than that figure, and a flip-flop set to opposite states by said coincidence detectors.

9. The combination according to claim 7 and including means for providing the transducing head with a sufficiently long time constant to suppress induction of playback signals therein due to the smaller, double frequency swings of the resultant flux pattern.

10. The combination according to claim 8 and including means for providing the transducing head with a sufficiently long time constant to suppress induction of playback signals therein due to the smaller, double frequency swings of the resultant flux pattern.

References Cited in the file of this patent

UNITED STATES PATENTS

| | | |
|---|---|---|
| 2,633,564 | Fleming | Mar. 31, 1954 |
| 2,676,245 | Doeltz | Apr. 20, 1954 |
| 2,685,682 | Sepahban | Aug. 3, 1954 |
| 2,704,361 | Pouliart | Mar. 15, 1955 |
| 2,734,186 | Williams | Feb. 7, 1956 |